Figure 1:
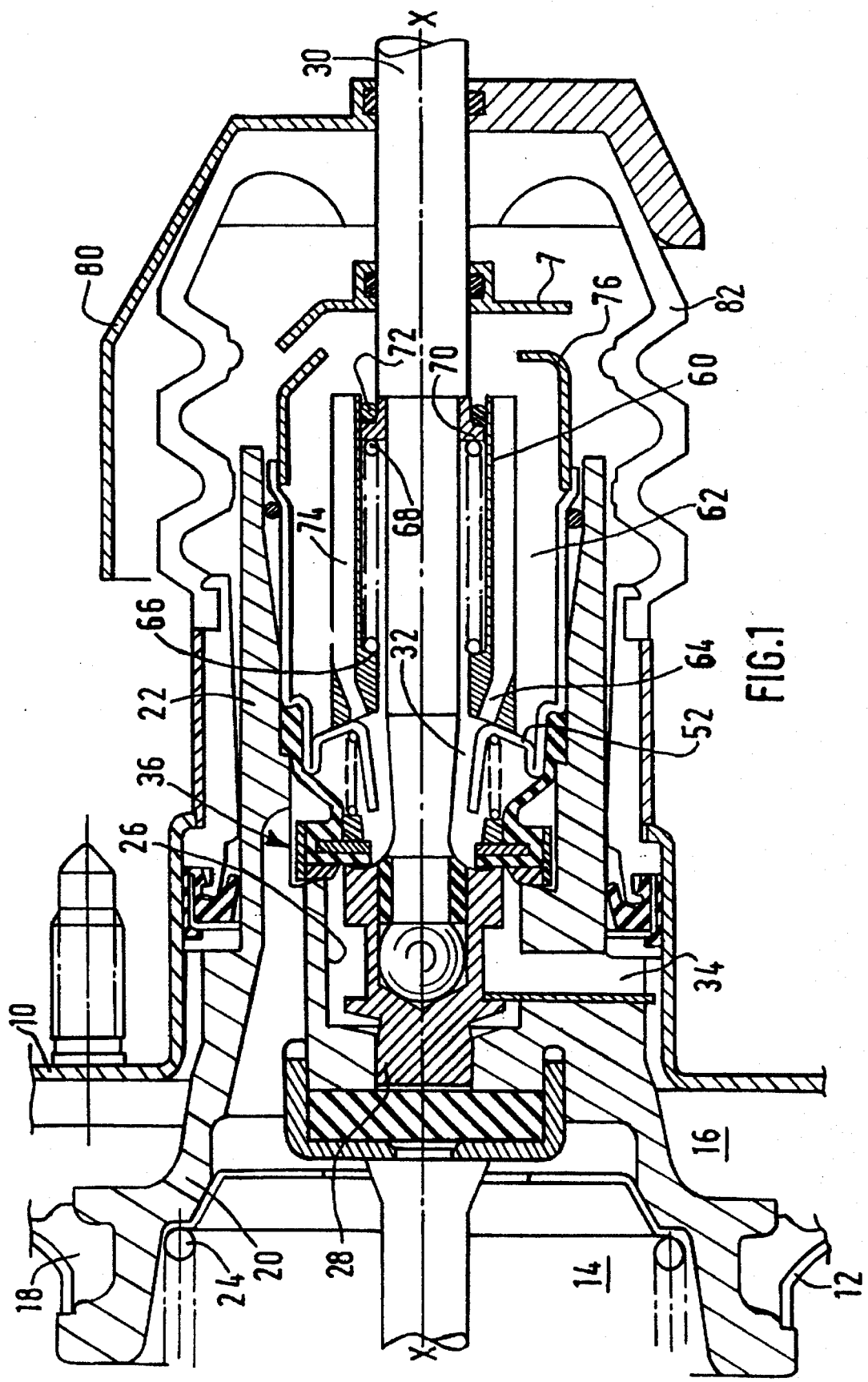

United States Patent [19]

Verbo et al.

[11] Patent Number: 5,630,350
[45] Date of Patent: May 20, 1997

[54] PNEUMATIC SERVO FOR BOOSTED BRAKING WITH SILENT OPERATION

[75] Inventors: Ulysse Verbo, Aulnay-Sous-Bois; Jean Claude Monteillet, Drancy, both of France

[73] Assignee: AlliedSignal Europe Services Techniques, Drancy, France

[21] Appl. No.: 360,782

[22] PCT Filed: Nov. 29, 1994

[86] PCT No.: PCT/FR94/01382

§ 371 Date: Dec. 27, 1995

§ 102(e) Date: Dec. 27, 1995

[87] PCT Pub. No.: WO95/18733

PCT Pub. Date: Jul. 13, 1995

[30] Foreign Application Priority Data

Jan. 7, 1994 [FR] France ................... 94 00124

[51] Int. Cl.$^6$ ................................................. F15B 9/10
[52] U.S. Cl. ................................................. 91/376 R
[58] Field of Search ................................ 91/376 R

[56] References Cited

U.S. PATENT DOCUMENTS

| | | | |
|---|---|---|---|
| 3,499,288 | 3/1970 | Randol | 91/376 R |
| 4,085,656 | 4/1978 | Ando | 91/376 R |
| 4,116,218 | 9/1978 | Acre et al. | 91/376 R |
| 4,598,625 | 7/1986 | Belart | 91/376 R |
| 4,716,814 | 1/1988 | Yamakoshi | 91/376 R |
| 4,770,082 | 9/1988 | Kawasumi | 91/376 R |
| 4,777,865 | 10/1988 | Gautier | 91/376 R |
| 5,233,904 | 8/1993 | Gautier et al. | 91/376 R |
| 5,249,505 | 10/1993 | Hewitt | 91/376 R |

*Primary Examiner*—F. Daniel Lopez
*Attorney, Agent, or Firm*—Leo H. McCormick, Jr.

[57] ABSTRACT

A pneumatic servo for assisting with braking. The servo has a casing with an axis of symmetry and is divided in a leaktight fashion by a movable wall structure into a front chamber which is permanently connected to a source of partial vacuum and a rear chamber connected selectively to the front chamber or to the surrounding environment by a three-way valve. The three-way valve is actuated by a plunger which slides in a bore in the movable wall in response to an axial control rod. The control rod is subjected to the action of a return spring located in an annular space between the control rod and a tubular part on the rear of the wall structure which extends or projects through the casing. The three-way valve being located in this tubular part and includes a shutter element which interacts via a first annular surface with a first valve seat formed on the plunger and via a second annular surface with a second valve seat formed on the movable wall. The first and second annular surfaces are located in different transverse planes and are joined together by a frustoconical surface. The frustoconical surface guiding the flow of air from the environment past the first valve seat such that a silent operation of the servo occurs when an actuation occurs through an input force being applied to the axial control rod.

11 Claims, 3 Drawing Sheets

PNEUMATIC SERVO FOR BOOSTED BRAKING WITH SILENT OPERATION

The present invention relates to pneumatic servos of the type of those which are used to provide assistance with braking of motor vehicles.

Such servos conventionally include a casing having an axis of symmetry, divided in leaktight fashion by a movable wall structure into a front chamber permanently connected to a source of partial vacuum, and a rear chamber connected selectively to the front chamber or to the outside atmosphere by a three-way valve actuated by a plunger sliding in a bore of the movable wall and secured to an axial control rod subjected to the action of a return spring located in an annular space between the control rod and a rear tubular part of the movable wall structure, projecting out of the casing, the three-way valve being located in this rear tubular part and including a shutter element interacting via a first annular surface with a first valve seat formed on the plunger and via a second annular surface with a second valve seat formed on the movable wall.

These servos are usually located in the engine compartment of the vehicle, on its bulkhead, so that the control rod of the servo projects into the passenger compartment so that it can be actuated by the driver. It follows that the rear central part of the movable wall, including the three-way valve, also projects into the passenger compartment.

As a result, when the driver actuates the brake pedal connected to the control rod of the servo, the latter sucks air at atmospheric pressure in from the passenger compartment of the vehicle. The air set in motion by the operation of the servo therefore generates noises which are wholly transmitted into the passenger compartment of the vehicle.

Attempts have been made to provide various solutions to this problem. For example, document FR-A-2,551,009 provides means for guiding the air in the immediate surroundings of the three-way valve, upstream and downstream of the latter.

Document FR-A-2,516,880 provides a silencer device made from crosslinked foam, located inside the rear central part of the movable wall structure, this device including an outer surface applied against the inner surface of this rear central part, and the inside of which is formed with uninterrupted passage openings pointing in the direction of the control rod to give a passage for the flow of air through the device.

Document DE-A-3,924,672 for its part provides a servo in which the intake for air at atmospheric pressure is situated in the engine compartment of the vehicle. However, these prior solutions still present devices which are imperfect, or economically inapplicable because they are too complicated. What is more, for the purpose of reducing the operating noise, these systems introduce into the path of the air obstacles to its movement which increase the response time of the servo at the beginning of its actuation phase.

Then again, studies conducted by the Applicant have shown that the main source of noise generated by the operation of a servo is the three-way valve itself, which forces the moving air through a winding path generating whistling noises which may become troublesome.

The object of the present invention is therefore to propose a servo, the operation of which is silent, implementing means which are simple, reliable and inexpensive, and which do not worsen the response time of the servo.

To this end, the invention proposes a servo of the type recalled above, in which the first and second annular surfaces are in different transverse planes, the first and second annular surfaces being joined together by a surface of frustoconical overall shape for guiding the moving air downstream of the first valve seat when it is moved away from the first annular surface.

Figure 2:
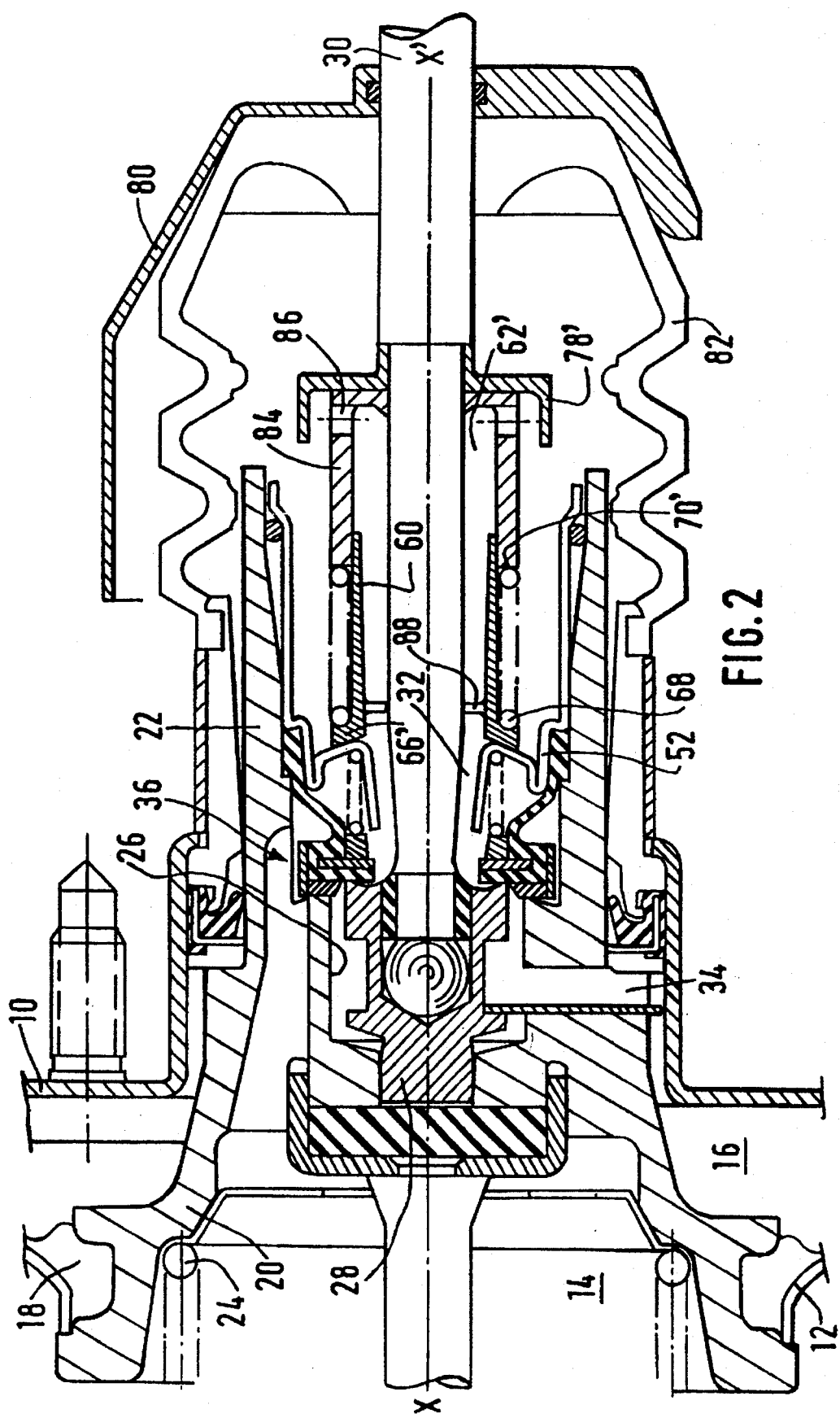
Figure 3:
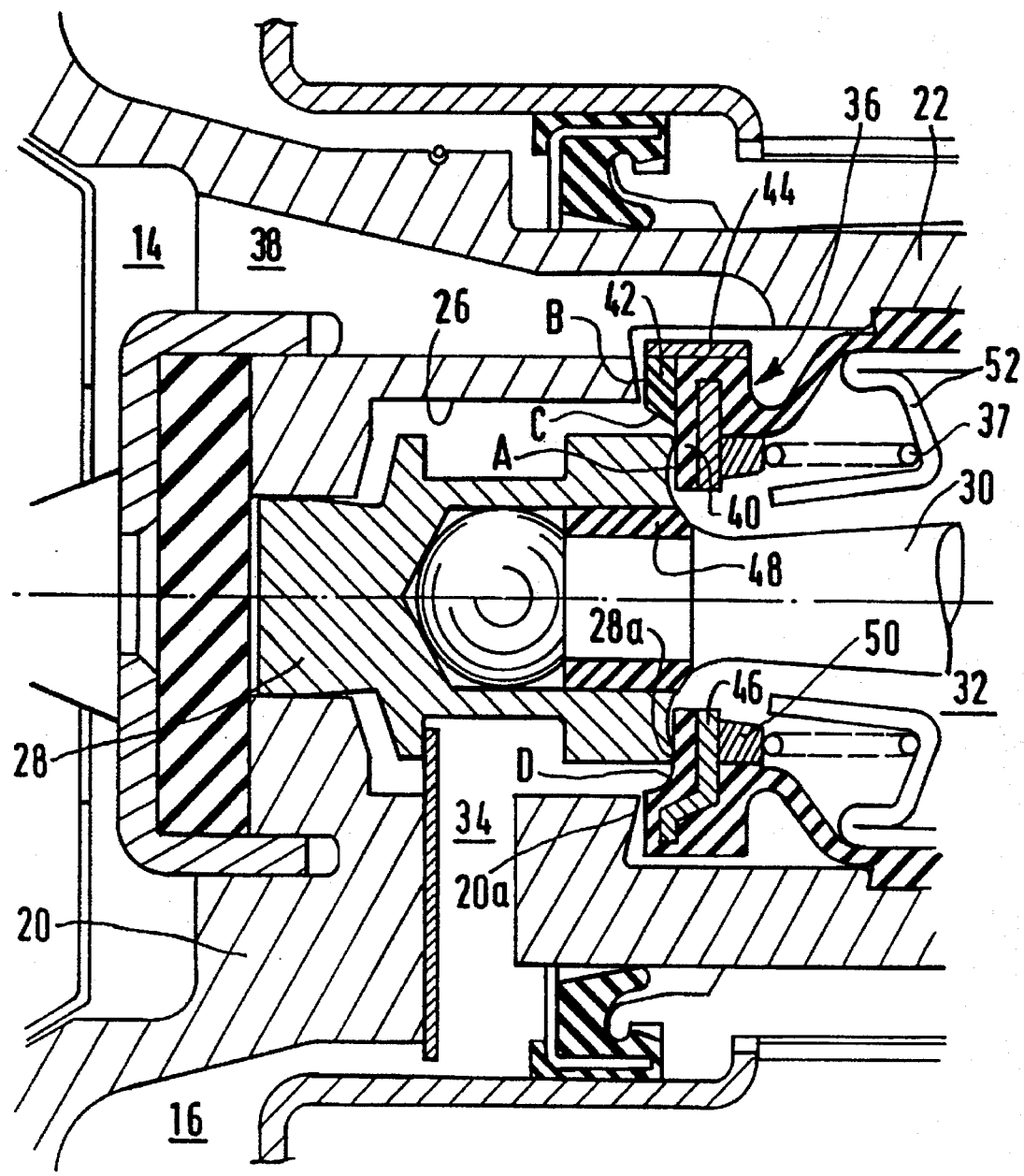

Other objects, characteristics and advantages of the present invention will emerge more clearly from the description which follows of one embodiment given by way of illustration with reference to the appended drawings in which:

FIG. 1 is a side view, in longitudinal section, representing the rear central part of a pneumatic servo for assisting with braking, produced in accordance with the present invention, FIG. 2 is a view similar to that of FIG. 1, of an embodiment variant, and FIG. 3 is a view on a larger scale of the three-way valve equipping the servo of the invention.

The figures represent the rear central part of a pneumatic servo for assisting with braking which servo is provided in order to be placed in the usual way between the brake pedal of a vehicle and the master cylinder controlling the hydraulic braking circuit of this vehicle. By convention, that part of the servo which points toward the master cylinder is termed the "front", and that part of the servo which points toward the brake pedal is termed the "rear". In the figures, the front is thus to the left and the rear to the right.

The servo represented comprises an outer casing 10 in the form of a shell, exhibiting a symmetry of revolution about an axis X-X'. Only the rear central part of this casing 10 is represented in the figures.

A movable wall structure 12 delimits a front chamber 14 and a rear chamber 16 inside the casing 10. The movable wall 12 is associated with a flexible unrolling membrane made of elastomer, the internal peripheral edge of which is received in a leaktight fashion by virtue of a bead 18 in a hollow boost piston 20 located along the axis X-X' of the servo, and the external peripheral edge (not represented) of which is fixed in leaktight fashion to the external casing 10.

The hollow piston 20 extends to the rear in the form of a tubular part 22 which passes in leaktight fashion through the rear wall of the casing 10. A compression spring 24 interposed between the piston 20 and the front wall (not represented) of the casing 10 normally holds the piston 20 in the rear rest position illustrated in the figures, in which position the rear chamber 16 has its minimum volume and the front chamber 14 has its maximum volume.

In the central part of the movable wall situated in front of the rear tubular part 22, the piston 20 exhibits a bore 26 in which is slidingly received a plunger 28 which also exhibits a symmetry of revolution about the axis X-X'. The front end of a rod 30 for controlling the servo, which rod is also located along the axis X-X', is mounted so that it can swivel in a blind bore of the plunger 28.

The rear end (not represented) of the control rod 30, which projects outside the tubular part 22, is controlled directly by the brake pedal (not represented) of the vehicle.

The annular space 32 around the control rod 30 can communicate with the rear chamber 16 through a radial passage 34 formed in the central part of the piston 20 when boost means, controlled by the plunger 28, are actuated.

As is conventional, and as best seen in FIG. 3, these assistance means comprise a three-way valve including an annular shutter 36 and two annular valve seats 20a and 28a respectively formed at the back of the central part of the piston 20 and at the back of the plunger 28, a valve spring 37 urging the shutter 36 toward the seats 20a and 28a.

When the control rod 30 is in the rear rest position, the three-way valve normally establishes a communication between the two chambers 14 and 16 of the servo via the radial passage 34 and a substantially axial passage 38 formed in the central part of the piston 20, the valve seat 20a being moved slightly away from the annular shutter 36.

When the driver of the vehicle actuates the brake pedal, this results in a forward movement of the control rod 30, of the plunger 28 and of the shutter 36 which, in a first instance, isolates the chambers 14 and 16 from one another by closing the valve passage 20a–36 and then, in a second instance, opens the valve passage 28a–36 and allows the communication between the rear chamber 16 and the annular space 32.

In a conventional design of a three-way valve, as illustrated by the aforementioned document DE-A-3,924,672, the annular space 32 communicates with the outside atmosphere axially, that is to say around the control rod 30. The air is thus sucked into the rear chamber 16 through the valve passage 28a–36 between the shutter 36 and the valve seat 28a formed on the plunger 28.

In such a design, the gap consisting of the valve passage 28a–36 constitutes a source of noises. Conventionally, a filter is located between the control rod and the rear end of the tubular part 22, to fulfill the functions both of an air filter and of a noise attenuator. In this latter function, the filter offers a significant resistance to the passage of the air, and is therefore an impediment to the operation of the servo, which worsens the response time of the latter.

The object of the present invention is precisely to reduce the noise generated by the three-way valve, by providing at least one surface for guiding the moving air. As is best seen in FIG. 3, the annular surfaces of the shutter 36 which interact with the valve seats 20a and 28a are offset, and are joined together by an approximately frustoconical surface.

More precisely, that surface of the shutter pointing toward the front includes a first planar annular surface A interacting with the valve seat 28a formed on the plunger 28, and a second planar annular surface B interacting with the valve seat 20a formed on the piston 20, the annular surface B being formed in a transverse plane situated forward of the transverse plane containing the annular surface A and having an inside diameter greater than the outside diameter of the surface A. These two surfaces A and B are joined together by a third surface C, of frustoconical overall shape.

The shutter 36 may be formed, as has been represented on the upper half of FIG. 3, of two annular elements 40 and 42, each one respectively bearing one of the planar annular surfaces A and B, the frustoconical surface C being formed at the inside periphery of the element 42. A ring 44 could be used for joining the elements 40 and 42 together.

The shutter 36 may equally well be formed, as has been represented on the lower half of FIG. 3, of a single element on which are formed the three surfaces A, B and C. The insert 46, conventionally used for stiffening the shutter 36, could itself be produced in a configuration in two planes, so that the surfaces A and B exhibit the same elasticity in their interaction with the valve seats 20a and 28a.

In the two abovementioned cases, the surface C could advantageously be joined to the surface A by a rounded surface D, as seen on the lower half of FIG. 3. Likewise, in these two cases, provision may advantageously be made for producing the annular surface B so that its inside diameter is substantially equal to the diameter of the valve seat 20a, itself substantially corresponding to the diameter of the bore 26. Thus, any discontinuity in the guiding of the air between the surface A, the surface C and the wall of the wall of the bore 26 is avoided.

Various tests have shown that the half-angle at the vertex of the frustoconical surface C may lie between 15 and 75 degrees, it being possible, however, for a value of 30 degrees for this angle, thus giving an angle of 60 degrees between the surface C and the wall of the bore 26, to be considered as giving the best results.

According to the foregoing explanations, it will have been understood how the invention makes it possible to reduce the operating noise of the three-way valve. Indeed, when the control rod 30 is actuated, the annular surface B firstly comes into contact with the valve seat 20a in order to isolate the chambers 14 and 16 from one another. Next, the valve seat 28a starts to move away from the annular surface A in order to allow air at atmospheric pressure in the annular space 32 to penetrate into the rear chamber 16, via the valve passage 40–28a and the radial passage 34.

It can therefore be seen that the moving air is guided as soon as it leaves the valve passage 28a–40, via the surface C, in order to prevent it from abruptly encountering the wall of the bore 26 and from being the subject of turbulence generating, in combination with the gap in the valve passage, whistling noises which would be transmitted into the passenger compartment of the vehicle. It has thus been possible for the Applicant to measure, over the spectrum of the operating noise of the servo, that this arrangement alone gives, by comparison with a conventional three-way valve, a decrease of more than 10 dB over a frequency range lying between 500 Hz and 1500 Hz, which corresponds to a very substantial decrease in the audible level.

Such an improvement in the operating noise is additionally obtained without any increase in the response time of the servo, and an improvement in this response time is even noted. Indeed, according to the invention, the flow of air penetrating into the rear chamber is improved by the particular shape of the shutter 36. Since, on the other hand, the flow cross section downstream of the three-way valve, in a transverse plane between the plunger 28 and the bore 26, is constant, the flow rate of air is also improved, and the response time decreased.

This performance may further be improved with the aid of additional means for guiding the moving air, upstream of the three-way valve. Thus, a ring 48 may be located between the control rod 30 and the blind bore of the plunger 28, this ring being produced of a flexible material so as not to hinder the swiveling mounting of the rod 30 in the plunger 28. The rear end profile of the ring 48 is bevelled in order to join the profiles of the control rod 30 and of the valve seat 28a together.

Likewise, a ring 50 may be located on the rear face of the shutter 36 and act, for example, as a support for the spring 37, bearing, on the other hand, on a dished part 52 secured to the tubular rear part 22 of the piston 20, so as to form a substantially closed volume for the spring 37 and prevent the moving air from penetrating into this volume and generating additional noises.

On the other hand, the Applicant has demonstrated another source of operating noises of a servo. Indeed, in a conventional servo design, as illustrated by the aforementioned document DE-A-3,924,672, the air at atmospheric pressure reaches the three-way valve after it has passed through the toms of the spring for returning the control rod, offering an obstacle to the passage of the moving air, allowing it only a reduced passage cross-section and giving rise to turbulence in the moving air, all of which cause the generation of noises.

The present invention also makes provision for eliminating this source of noises. In order to do this, the invention provides a division between the moving air upstream of the three-way valve, and the spring for returning the control rod.

FIG. 1 represents a first embodiment of such a division, consisting, in this example, of a cylindrical sleeve 60 located in the rear tubular part 22. The sleeve 60 for example bears via its front end on the rear end of the dished part 52 on which the valve spring 37 bears and which serves as a fixture for fixing the rear end of the shutter 36 on the rear tubular part 22.

The front end of the sleeve 60 may advantageously exhibit a concave spherical shape, and the rear face of the dished part 52 may exhibit a convex spherical shape of the same radius, and of the same center situated approximately at the center of the swiveling mounting of the control rod 30 and of the plunger 28, so as to allow this swiveling mounting to operate.

The sleeve 60 has an outside diameter distinctly less than the inside diameter of the tubular part 22 so as to define an annular volume 62 between these elements. Openings 64 are made in the front end of the sleeve 60, to make the space 32 and the volume 62 communicate.

What is more, the sleeve 60 is formed, on its internal surface with an internal radial shoulder 66, formed to the rear of the openings 64, to act as a support for a compression spring 68 which also bears on a shoulder 70 of the control rod 30, and acts as a spring for returning the control rod. An O-ring 72 provides sealing between the control rod 30 and the sleeve 60. The sleeve 60 thus forms a division of the annular space 32 into an annular volume 62, communicating with the three-way valve 36 through the openings 64, and into a housing for the spring 68 for returning the control rod 30, the housing consisting of the shoulders 66 and 70.

It is therefore understood that when the control rod 30 is actuated, the air at atmospheric pressure can arrive at the rear chamber 16 of the servo by passing through the annular volume 62, the openings 64 and the annular space 32. The moving air thus circumvents the return spring 68 round the outside, which eliminates the source of noise which this constituted, the air situated around the spring 68 being static by virtue of the seal 72.

Advantageously, by virtue of the invention, the sleeve 60 allows elimination of the source of operating noise of the servo, constituted by the spring for returning the control rod, and it makes it possible to attenuate, still further, the other source of noise, constituted by the three-way valve, already aattenuated by the shutter 36 described above.

Indeed, the sleeve 60 makes it possible to install a silencer device in the annular volume 62. In particular, the sleeve 60 may be equipped on its external surface with fins 74 which are intended to extend the path of the air in front of the openings 64. The fins 74 could be formed of a single piece, for example by molding, with the sleeve 60, in order to form baffles in the passage of the air in the volume 62, or in order to form one or more ducts of helical shape.

The fins 74 may occupy the entire volume 62, or only occupy part of it, the rest of the volume 62 being filled with sound-absorbing material. Of course, the fin or fins 74 will be arranged so that they extend the path of the air without impeding the movement thereof, in order not to reduce the response time of the servo.

In order further to limit the propagation of the operating noises of the servo, obstacles or baffles such as 76, 78 and 80 could be arranged on the path of the air before it reaches the volume 62, and a gaiter 82 made of a porous and deformable material, such as a porous elastomer, offering a significant surface area subjected to the outside atmosphere, and therefore presenting practically no obstacle to the air passing through it, and simultaneously fulfilling the dust-trap filter function, could be used.

It is therefore understood that the operating noise generated by the three-way valve, already attenuated to a large extent by the configuration of the shutter 36 according to the invention, is further attenuated by the length of the path imposed in the volume 62 by the fin or fins 74, the sound-absorbing material, and the possible baffles 78 to 80, and is no longer transmitted into the passenger compartment of the vehicle.

FIG. 2 represents a variant of the embodiment of FIG. 1, in which the same elements bear the same reference numerals.

According to this variant, the sleeve 60 is formed on its outside surface with an outer radial shoulder 66', acting as a support for the spring 68. The control rod 30 is moreover secured to a sleeve 84, capable of sliding around the sleeve 60. The front end of the sleeve 84 forms a stop 70' acting as a support for the spring 68. The sleeve 60 is formed, as before, with a concave spherical front end, in order to interact with the rear face of the dished part 52.

The sleeve 60 thus forms, as in FIG. 1, in interaction with the dished part 52 and the sleeve 84, a division of the annular space 32 into an annular volume 62', communicating with the three-way valve 36, and into a housing for the spring 68 for returning the control rod 30, this housing being made up by the shoulders 66' and 70'. The annular volume 62' may communicate with the outside atmosphere by virtue of openings 86 formed in the rear end of the sleeve 84.

It is likewise understood that when the control rod 30 is actuated, the air at atmospheric pressure can reach the rear chamber 16 of the servo by passing through the openings 86, the annular volume 62' and the annular space 32. The moving air thus circumvents the return spring 68, this time from inside, which further eliminates the source of noise which it constituted.

As seen above, one or more fins could be formed on the internal surface of the sleeve 60, in the volume 62', in order to form baffles or ducts of helical shape. These fins will participate in the centering of the sleeve 60 around the control rod 30, in the same way as spacers such as represented at 88 in FIG. 2. The device described could equally well be perfected by using baffles 78' and 80, as well as a flexible porous gaiter 82.

The various arrangements described hereinabove, implemented simultaneously, and mainly the shutter 36 including the three surfaces A, B and C in association with the sleeve 60 of FIGS. 1 or 2, have thus made it possible to produce a servo which is much less noisy than a servo of conventional design, with a distinctly improved response time.

Of course the invention is not limited to the embodiments which have been described, but is capable, in contrast, of receiving numerous modifications which will be obvious to the person skilled in the art.

We claim:

1. A pneumatic servo for assisting with braking, including a casing having an axis of symmetry, divided in leaktight fashion by a movable wall structure into a from chamber permanently connected to a source of partial vacuum, and a rear chamber connected selectively to the front chamber or to an outside atmosphere by a three-way valve actuated by a plunger sliding in a bore of the movable wall structure, said three three-way valve being connected to an axial control rod subjected to the action of a return spring located in an annular space between the control rod and a rear tubular part extending from the movable wall structure and projecting out of the casing, said three-way valve being located in this rear tubular part and including a shutter element interacting via a first annular surface with a first valve seat formed on the plunger and via a second annular surface with a second valve seat formed on the movable wall, said first and second annular surfaces being in different transverse planes, characterized in that said first and second annular surfaces are joined together by a surface having an overall frustoconical shape for guiding a downstream flow of air from said outside atmosphere as it moves past said first valve seat when said first valve seat moves away form said first annular surface and that said second annular surface and said frustoconical surface are formed on an annular element secured to an annular element on which said first annular surface is formed.

2. The servo according to claim 1, characterized in that said second annular surface is located in a first transverse plane forward of a second transverse plane in which said first annular surface is situated, said second annular surface having an inside diameter greater than an outside diameter of said first annular surface.

3. The servo according to claim 2, characterized in that a half-angle at the vertex of said frustoconical surface lies between 15 and 75 degrees.

4. The servo according to claim 2, characterized in that an inside diameter of said second annular surface is substantially equal to a diameter of said second valve seat and diameter of said bore of said movable wall.

5. The servo according to one claim 1, characterized in that said first annular surface and the frustoconical surface are joined together by a rounded surface.

6. The servo according to claim 1, characterized in that said shutter further includes means for guiding the flow of air upstream form said first valve seat.

7. The servo according to claim 6, characterized in that said means for guiding the flow of air upstream of said first valve seat include a ting make of flexible material located between said control rod and said plunger, said ring having a profile for joining profiles of said control rod and said first valve seat together to provide for smooth flow.

8. The servo according to claim 6, characterized in that said means for guiding the flow of air upstream of said first valve seat include a ring located on a rear face of said shutter element and together with a dished part forms a substantially closed volume for a spring which urges said shutter element forward.

9. The servo according to claim 6, characterized in that said means for guiding the flow of air upstream of said first valve seat include a sleeve which divides an annular space between said control rod and a rear tubular part into an annular volume communicating with said three-way valve and into a housing for said return spring.

10. The servo according to claim 9, characterized in that said sleeve has at least one fin formed on a surface delimiting said annular volume.

11. The servo according to claim 9, characterized in that said annular volume contains a sound-absorbing material.

* * * * *